US011994500B2

(12) United States Patent
Basile et al.

(10) Patent No.: US 11,994,500 B2
(45) Date of Patent: May 28, 2024

(54) TECHNIQUES FOR TEMPERATURE CONTROL OF SEPARATION DEVICES AND OPTICAL DETECTION DEVICES OF MASS ANALYSIS SYSTEMS

(71) Applicant: WATERS TECHNOLOGIES CORPORATION, Milford, MA (US)

(72) Inventors: Mark J. Basile, Medford, MA (US); Jeffrey Musacchio, Sharon, MA (US); Michael O. Fogwill, Uxbridge, MA (US); Sebastien Besner, Bolton, MA (US); Joseph D. Michienzi, Plainville, MA (US); Wade P. Leveille, Douglas, MA (US)

(73) Assignee: Waters Technologies Corporation, Milford, MA (US)

( * ) Notice: Subject to any disclaimer, the term of this patent is extended or adjusted under 35 U.S.C. 154(b) by 674 days.

(21) Appl. No.: 17/084,998

(22) Filed: Oct. 30, 2020

(65) Prior Publication Data

US 2021/0132012 A1 May 6, 2021

Related U.S. Application Data

(60) Provisional application No. 62/929,398, filed on Nov. 1, 2019.

(51) Int. Cl.
*G01N 30/74* (2006.01)
*G01N 30/30* (2006.01)
*G01N 30/02* (2006.01)

(52) U.S. Cl.
CPC ............ *G01N 30/74* (2013.01); *G01N 30/30* (2013.01); *G01N 2030/027* (2013.01); *G01N 2030/3038* (2013.01); *G01N 2030/746* (2013.01)

(58) Field of Classification Search
CPC .. G01N 30/74; G01N 30/30; G01N 2030/027; G01N 2030/3038;
(Continued)

(56) References Cited

U.S. PATENT DOCUMENTS

| 4,440,013 A | * | 4/1984 | Adams | G01N 30/74 |
| | | | | 73/23.39 |
| 4,498,774 A | * | 2/1985 | Yeung | G01N 21/21 |
| | | | | 356/411 |

(Continued)

FOREIGN PATENT DOCUMENTS

| CN | 109270199 A | * | 1/2019 | ............. G01N 30/74 |
| EP | 3410097 A1 | * | 12/2018 | ............. B03B 5/626 |

(Continued)

OTHER PUBLICATIONS

International Preliminary Report on Patentability for International Patent Application No. PCT/US2020/058129, dated May 3, 2022.

(Continued)

*Primary Examiner* — Mohamed K Amara
(74) *Attorney, Agent, or Firm* — Goodwin Procter LLP

(57) ABSTRACT

Techniques and apparatus for thermally controlled interfaces for separation devices and optical flow cell devices with minimized post-column volumes are described. In one embodiment, for example, a column-optical cell assembly may include an insulating device, a chromatography column arranged within the insulating device, and an optical flow cell in fluid communication with the chromatography column, the chromatography column arranged within a minimum distance of the optical flow cell.

14 Claims, 8 Drawing Sheets

(58) Field of Classification Search
CPC ............. G01N 2030/746; G01N 21/05; G01N 21/0332; G01N 2030/3046; G01N 2030/621
See application file for complete search history.

(56) References Cited

U.S. PATENT DOCUMENTS

| | | | | |
|---|---|---|---|---|
| 4,575,424 | A * | 3/1986 | Allington | G01N 21/05 210/198.2 |
| 4,587,835 | A * | 5/1986 | Adams | G01N 30/74 250/343 |
| 4,668,091 | A * | 5/1987 | Lagesson | G01N 21/05 73/23.39 |
| 4,822,166 | A * | 4/1989 | Rossiter | G01N 21/05 356/244 |
| 4,886,356 | A * | 12/1989 | Paradis | G01N 21/05 356/440 |
| 5,083,450 | A * | 1/1992 | Grindstaff | G01N 30/7206 422/89 |
| 5,815,258 | A * | 9/1998 | Nakanishi | G01N 30/74 204/603 |
| 6,188,813 | B1 * | 2/2001 | Dourdeville | G02B 6/381 385/12 |
| 6,199,257 | B1 * | 3/2001 | Munk | G01N 30/74 29/458 |
| 6,368,560 | B1 * | 4/2002 | Ostrander | G01N 31/005 422/68.1 |
| 9,116,158 | B2 * | 8/2015 | Harrison | G01N 33/0004 |
| 9,752,978 | B2 * | 9/2017 | Kraiczek | B32B 38/10 |
| 10,413,846 | B2 | 9/2019 | Bouvier et al. | |
| 10,478,750 | B2 | 11/2019 | Bouvier et al. | |
| 10,677,767 | B2 * | 6/2020 | Harrison | G01N 33/0027 |
| 11,378,559 | B2 * | 7/2022 | Zhang | G01N 30/74 |
| 2003/0098419 | A1 * | 5/2003 | Ji | G01N 21/33 250/373 |
| 2007/0182965 | A1 * | 8/2007 | Kamlet | G01N 21/3504 356/437 |
| 2011/0299084 | A1 * | 12/2011 | Feitisch | G01N 21/031 356/433 |
| 2012/0184722 | A1 * | 7/2012 | Samper | G01N 30/88 534/10 |
| 2014/0192343 | A1 | 7/2014 | Harrison et al. | |
| 2017/0282096 | A1 | 10/2017 | Bouvier et al. | |
| 2018/0059005 | A1 * | 3/2018 | Marshall | G01N 21/39 |
| 2019/0376938 | A1 * | 12/2019 | Harrison | G01N 33/0027 |
| 2020/0139264 | A1 | 5/2020 | Bouvier et al. | |
| 2020/0139265 | A1 | 5/2020 | Bouvier et al. | |
| 2021/0239601 | A1 * | 8/2021 | Ito | G01N 21/05 |

FOREIGN PATENT DOCUMENTS

| | | | | |
|---|---|---|---|---|
| JP | S63195260 | U | 12/1988 | |
| JP | H09264890 | A | 10/1997 | |
| JP | H1038870 | A | 2/1998 | |
| JP | 2000105147 | A * | 4/2000 | ........ G01N 21/0332 |
| WO | WO-2005116614 | A1 * | 12/2005 | ............ G01N 21/05 |

OTHER PUBLICATIONS

International Search Report and Written Opinion for International application No. PCT/US2020/058129, dated Feb. 17, 2021, 12 pages.

Gritti, F., "Vacuum-Jacketed Columns: Maximum Efficiency, Easy Deployment Without Oven, and Improved LC-MS Performance", LCGC Special Issues May 2, 2019 vol. 32, Issue 5, 10 pages. (2019).

* cited by examiner

TECHNIQUES FOR TEMPERATURE CONTROL OF SEPARATION DEVICES AND OPTICAL DETECTION DEVICES OF MASS ANALYSIS SYSTEMS

CROSS-REFERENCE TO RELATED APPLICATIONS

This application claims the benefit of and priority to U.S. Provisional Patent Application No. 62/929,398, filed on Nov. 1, 2019, the entire contents of which is hereby incorporated by reference.

TECHNICAL FIELD

Embodiments herein generally relate to processes and interfaces operative to facilitate temperature control of fluids flowing between chromatography separation devices and optical detection devices.

BACKGROUND

Chromatography techniques may be coupled with various detectors to provide analytical processes that combine the resolving power of chromatography with detection methods specialized for certain analytes of interest. For example, a liquid chromatography (LC) system may be used to separate a sample for an optical detector, such as UV-visible spectrophotometer, fluorescence detector, and refractive index (RI) detector. The performance of an LC-based system is reliant on management of the LC system to ensure transfer of the sample solution to the optical detector under proper conditions. A primary factor that controls LC system performance is thermal management of the separation column and the separated compound solution as it travels to and through the detector. Thermal management of the separated compound solution may be a function of system materials, column heater operation, transport of the solution from the LC separation column to the detector, and/or the like. Deficient LC system temperature management may result in band broadening, poor peak capacity, and/or reduced detection signal-to-noise (S/N) ratio.

DETAILED DESCRIPTION

Figure 1:
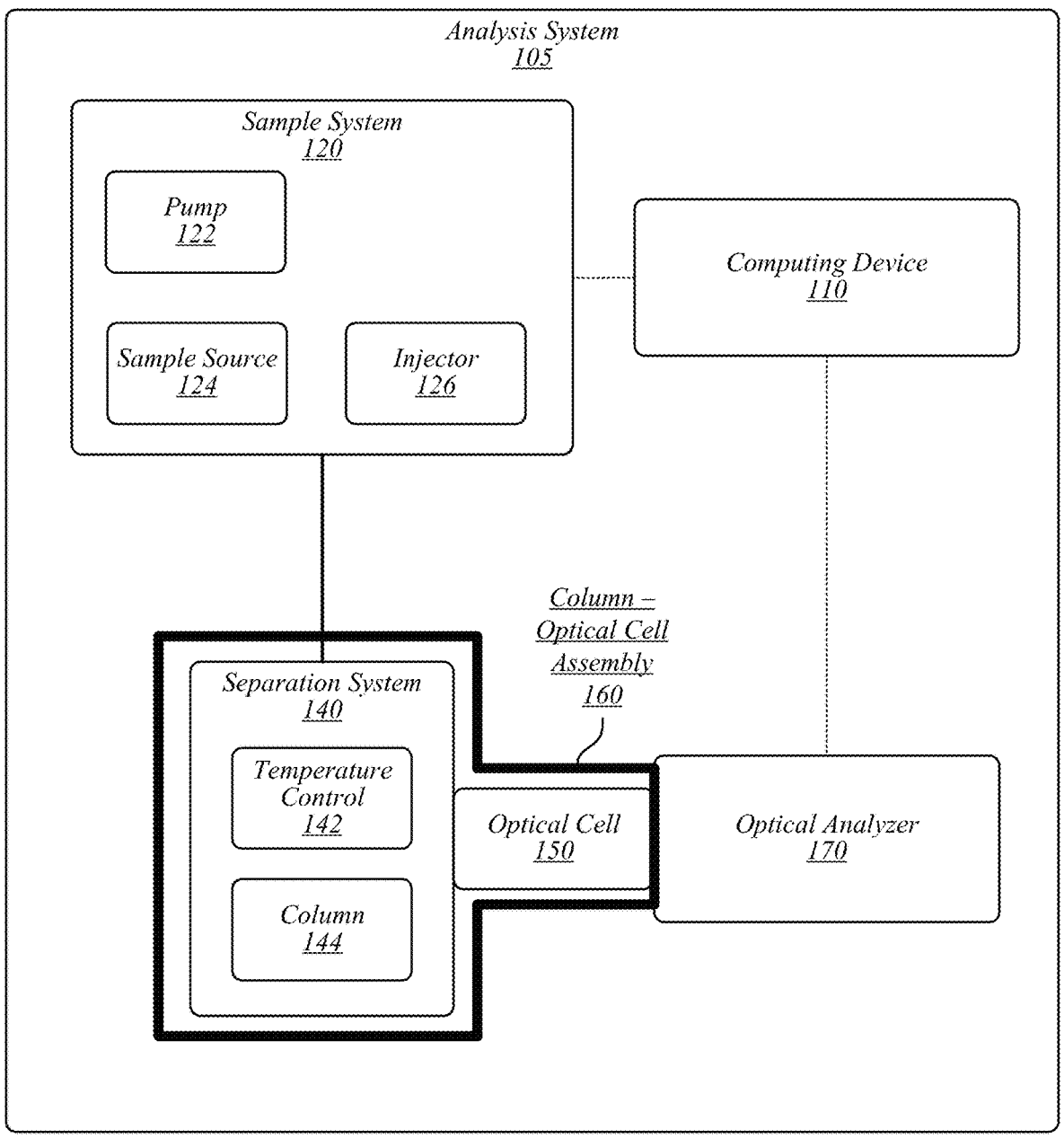
FIG. 1 illustrates an embodiment of a first operating environment.

Various embodiments may generally be directed toward systems, methods, and/or apparatus for performing mass and/or concentration analysis of a sample. In some embodiments, an analysis system may include a chromatography component and an optical detection system. The chromatography component may operate to separate a sample using a chromatography column (or separation column) to generate a separated compound solution (for instance, a mobile phase). In various embodiments, the optical detection system may interface with the chromatography component to receive or otherwise access the separated compound solution to analyze the sample via an optical analysis process.

Analysis systems according to some embodiments may be configured to include an interface between an optical detector component, such as an optical cell, and a separation column that provides for thermal control and/or low dispersion between the optical detector component and the separation column. In various embodiments, analysis systems may provide an environment for an optical cell and a separation column interface in which heat transfer, in and/or out, is minimized, reduced, or even eliminated or substantially eliminated. In exemplary embodiments, the optical cell may be equilibrated at the same or substantially similar temperature to a temperature of a mobile phase exiting the column and entering the optical cell.

In conventional systems, detectors used in chromatographic systems employ lengthy interconnecting lines between the outlet of the separation device and the detector cell inlet. Accordingly, such lines typically contribute to sample dispersion. In addition, the lengthy interconnecting lines provide for thermal loss between the outlet of the separation device and the detector cell. As a result, conventional systems experience a thermal discrepancy between the separation device and the detector cell that may contribute to, among other things, baseline noise. The described embodiments solve those problems by locating the separation device in close proximity to the detector cell. The described embodiments also provide for both to be in close proximity to each other in one or more compartments.

Optical detectors such as UV-visible spectrophotometer, refractive index (RI), and fluorescence provide for the most common modes of detection in liquid chromatography (LC). In each of these detectors, it is desirable to maximize the signal-to-noise ratio (S/N) of the response to an analyte of interest relative to a blank injection. One technique to maximize response in each mode of detection is to minimize the width of the analyte band as it passes through the detector by reducing the extra-column dispersion in a chromatographic system. In conventional systems, the separation column and optical detector must be placed in specific locations in an instrument. For example, the column must reside in a column oven to maximize column performance and the optical cell must reside proximal to the light source and light detector (i.e., the optical bench).

Accordingly, some embodiments may operate to provide insulated chromatography columns, detector devices (for instance, optical cells), and/or combinations thereof (for instance, column-optical cell assemblies). In some embodiments, a chromatography column may be arranged within the analysis system to minimize the post-column volume of the separated compound solution. In general, the post-column volume is a volume of the separated compound solution between the outlet of the chromatography column and the outlet of optical cell. For example, in various embodiments, the chromatography column may be arranged within the system to minimize, reduce, or even eliminate or substantially eliminate a distance between the chromatography column and the detector. In some embodiments, a chromatography column (or an outer surface, gasket, and/or the like) may be interfaced directly or substantially directly with an optical cell.

In various embodiments, the chromatography column, optical cell, and/or column-optical cell assembly may be arranged within an insulating component. In some embodiments, the insulating component may be or may include vacuum-jacketing technology the same as or similar to vacuum-jacketing technology described in U.S. patent application Ser. Nos. 14/406,279 and/or 15/487,599, both of which are incorporated by reference. In various embodiments, vacuum-jacketing technology may allow placement of the column in close proximity to the optical cell of an optical detector. The vacuum-jacketing technology insulates a column, allowing for excellent chromatographic performance without the need for placing a column within a chromatographic oven. Since the vacuum-jacketing technology allows freedom of column placement in a system, the column can be placed very near the inlet of an optical detector to minimize the post-column system volume. Such reduction of post-column volume may result in dramatic improvement in chromatographic performance, for example, while operating under gradient conditions. The improvement of chromatographic performance translates directly to improved peak resolution and peak height.

In addition to maximizing analyte peak height some embodiments may allow for the baseline noise and drift of the detector to be minimized. One source of noise and drift in optical detection is due to changes in refractive index of the fluid as it passes through the optical pathway of the detector. Thermal mismatches between an optical cell and the incoming fluid (i.e., separated sample solution from a chromatography column) will result in changes in refractive index and contribute to optical noise and drift. In order to minimize this effect, the temperature of the incoming mobile phase fluid may be controlled to match the temperature of the optical cell. In some embodiments, an optical cell may be thermally controlled to a temperature the same or substantially similar to the measured or predicted mobile phase temperature at the outlet of the column. In various embodiments, a remotely-positioned optical cell can be placed within an insulating region (for instance, a vacuum-jacketed region) along with the column and pre-heater. In such embodiments, the cell may thermally equilibrate rapidly to the mobile phase temperature. In general, reducing the thermal mass of the optical cell may result in faster equilibration times.

In various embodiments, the vacuum-jacketing technology combined with a remotely-coupled optical cell may allow for further reduction of system volume (for instance, post-column volume) by placing the column and detector cell very close to the point of sample introduction. By reducing both pre and post-column volume of a system, both gradient and isocratic peak widths may be reduced. As such, improvements in peak resolution and other metrics may be facilitated under most operating conditions using analysis systems according to some embodiments.

In this description, numerous specific details, such as component and system configurations, may be set forth in order to provide a more thorough understanding of the described embodiments. It will be appreciated, however, by one skilled in the art, that the described embodiments may be practiced without such specific details. Additionally, some well-known structures, elements, and other features have not been shown in detail, to avoid unnecessarily obscuring the described embodiments.

In the following description, references to "one embodiment," "an embodiment," "example embodiment," "various embodiments," etc., indicate that the embodiment(s) of the technology so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

FIG. 1 illustrates an example of an operating environment 100 that may be representative of some embodiments. As shown in FIG. 1, operating environment 100 may include an analysis system 105 operative to perform concentration analysis of a sample. In some embodiments, analysis system 105 may be or may include a chromatography-optical analysis system. Although LC and optical analysis are used in examples in this detailed description, embodiments are not so limited, as other sample separation and sample detection systems capable of operating according to some embodiments are contemplated herein.

Analysis system 105 may include a sample system 120 operative to provide a sample for separation by separation system 140. In some embodiments, separation system 140 may include components for performing sample separation and controlling operational aspects thereof, such as temperature control 142. Separation system 140 may include a separation column 144 (or "column"). In exemplary embodiments, column 144 may be an LC column. In some embodiments, column 144 may be a column packed with various materials, solutions, and/or the like to separate a sample. Non-limiting examples of materials used to form packed column 144 may include porous particles, non-porous particles, superficially-porous particles, silica particles, polymer particles, organohybrid silica particles, combinations thereof, any of the foregoing particles with chemically modified surfaces, and/or the like. In some embodiments, column 144 may be part of a high-performance liquid chromatography (HPLC) system or an ultra-performance liquid chromatography (UPLC) system (or ultra-high-performance system liquid chromatography (UHPLC) system). For example, sample system 120, column 144, and/or temperature control 142 may form a separation system, such as an LC system, even though portions of the chromatography system may be arranged within or partially within different components (i.e., sample system 120, column-optical cell assembly 160, and/or the like).

In accordance with some aspects of the described embodiments, the chromatography column may have a length of about 20 mm to about 300 mm. In accordance with some aspects of the described embodiments, the chromatography column may have a length of about less than 100 mm. In accordance with some aspects of the described embodiments, the chromatography column may have a length of about 50 mm to about 100 mm. In accordance with some aspects of the described embodiments, the chromatography column may have a length of about 150 mm. In accordance with some aspects of the described embodiments, the chromatography column may have an inner diameter of about 100 μm to about 50 mm. In accordance with some aspects of the described embodiments, the chromatography column may have an inner diameter of about 1 mm to about 3 mm. In accordance with some aspects of the described embodiments, the chromatography column may have an inner diameter of about 2.1 mm to about 4.6 mm. In accordance with some aspects of the described embodiments, the chromatography column may have an inner diameter of about 4.6 mm.

In various embodiments, injector 106 may inject a sample from a sample source 124 into column 144. In some embodiments, column 144 may be arranged as part of or a column-optical cell assembly 160. In general, column-optical cell assembly 160 may be or may include an assembly that includes the separation system 140 and an optical detector or cell 150. In general, an optical cell 150 may include a component operative to receive a fluid from separation system 140 and to detect various optical aspects thereof. Non-limiting examples of optical detectors may include UV-visible spectrosphotometer, fluorescence detector, refractive index detector, Raman spectrometer, and/or the like. For example, optical cell 150 may include a cell body operative to receive a fluid (for instance, mobile phase from column 144), a light source or a light inlet to expose the fluid to a light, and a light outlet (for instance, windows, lenses, mirrors or optical fibers) for controlling the flow of light out of the cell to an optical analyzer 170.

In some embodiments, column-optical cell assembly 160 may include a housing and/or insulating layer. In various embodiments, at least a portion of column-optical cell assembly 160 may be arranged within a vacuum-jacketed insulating layer. In some embodiments, only column 144 may be arranged within insulating column-optical cell assembly 160. In other embodiments, column 144 and optical cell 150 may not be arranged within a common housing. In exemplary embodiments, optical cell 150 may be associated with an optical cell temperature control unit (not shown; see FIG. 3).

Sample may be temperature controlled via one or more temperature control units 142. In some embodiments, temperature control unit 144 may be or may include a cooler and/or a heater. In some embodiments, at least a portion of column 144 may be arranged within temperature control unit 142 (for instance, a heater). In other embodiments, column 144 may be arranged outside of temperature control unit 142. In various embodiments, temperature control unit 142 may be arranged in series between injector 126 and column 144 such that sample passes through temperature control unit 142 before reaching column 144.

Although temperature control unit 142 is depicted in FIG. 1 as being within separation system 140, embodiments are not so limited. Temperature control unit 142 may be arranged in column-optical cell assembly 160, sample system 120, other components of analysis system 105, or combinations thereof. In some embodiments, temperature control unit 142 may heat a sample (i.e., a mobile phase) prior to column 144. In exemplary embodiments, various sensors (not shown), such as temperature sensors, may be located on, within, or otherwise associated with separation system 140, column 144, and/or column-optical cell assembly 160 to monitor the temperature of the sample entering column 144 and/or the separated compound solution exiting column 144.

Optical analyzer 170 may send light to and receive light from optical cell 150. In various embodiments, optical analyzer 170 may include one or more light sources and/or one or more detectors, light filtering devices, light polarization devices, light diffraction devices, signal generating units, signal processing units, data processing units, and/or the like to process light received from optical cell.

Analysis system 105 may include a computing device 110 operative to control, monitor, manage, or otherwise process various operational functions of analysis system 105. In some embodiments, computing device 110 may be or may include a stand-alone computing device, such as a personal computer (PC), server, tablet computing device. In other embodiments, computing device 110 may be or may include processing circuitry in combination with memory, software, and other operational components.

In some embodiments, computing device 110, sample system 120, column-optical cell assembly 160, and/or optical analyzer 140 may include a processing circuitry (not shown) to perform functions according to some embodiments. Processing circuitry may be any type of analog circuit or digital processor capable of executing programs, such as a microprocessor, digital signal processor, microcontroller, and/or the like. As used in this application, the terms "logic," "circuitry," and/or "module" are intended to refer to a computer-related or analog circuit-related entity, either hardware, a combination of hardware and software, software, or software in execution.

Figure 2:
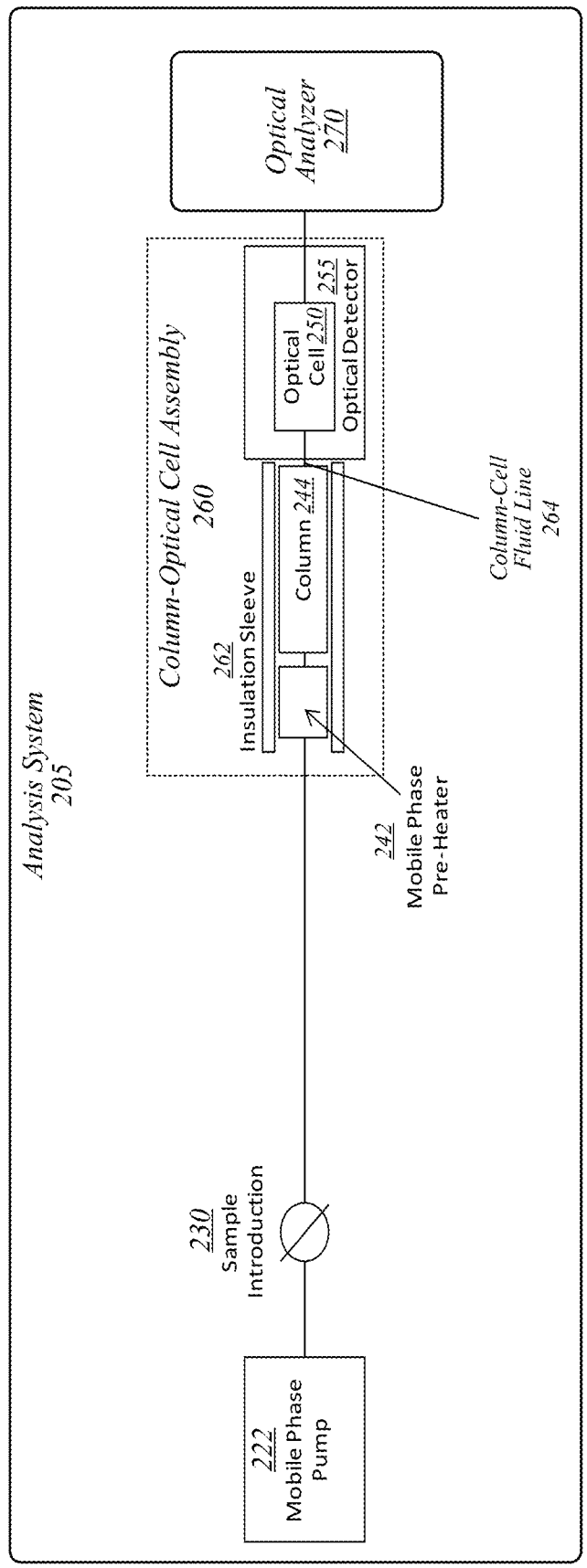
FIG. 2 illustrates an embodiment of a second operating environment.

FIG. 2 illustrates an example of an operating environment 200 that may be representative of some embodiments. As shown in FIG. 2, an analysis system 205 may include a mobile phase pump 222 operative to pump a sample through a sample introduction element 230 to a column-optical cell assembly 260. In various embodiments, column-optical cell assembly 260 may include a mobile phase pre-heater 242 arranged upstream of a column 244. In some embodiments, pre-heater 242 and column 244 may be arranged within an insulating element 262, such as an insulation sleeve. In some embodiments, insulating element 262 may be or may include a vacuum-jacket. An outlet of column 244 may be fluidically coupled to an optical cell 250 of an optical detector via a column-cell fluid line 264. In some embodiments, a temperature control device, the same or similar to mobile phase pre-heater 242 may be configured to heat the outlet (or fluid leaving the outlet) of column 244. In some embodiments, the light source, light filtering device and sensors (the optical analyzer 255) may also be part of the column-optical cell assembly. An example of this embodiment would be a single wavelength detector based on LED lighting.

In other embodiments, temperature control of column 244 via insulating sleeve 262 may allow for placement of column at or near an inlet of optical detector. In various embodiments, column-cell fluid line 264 may be minimized. For example, column-cell fluid line 264 may be about 1 centimeter (cm), about 0.5 cm, about 500 mm, about 100 mm, about 10 mm, about 5 mm, about 2 mm, about 1 mm, about 0.5 mm, about 0.0 mm, and any value or range between any two of these values (including endpoints).

Figure 3:
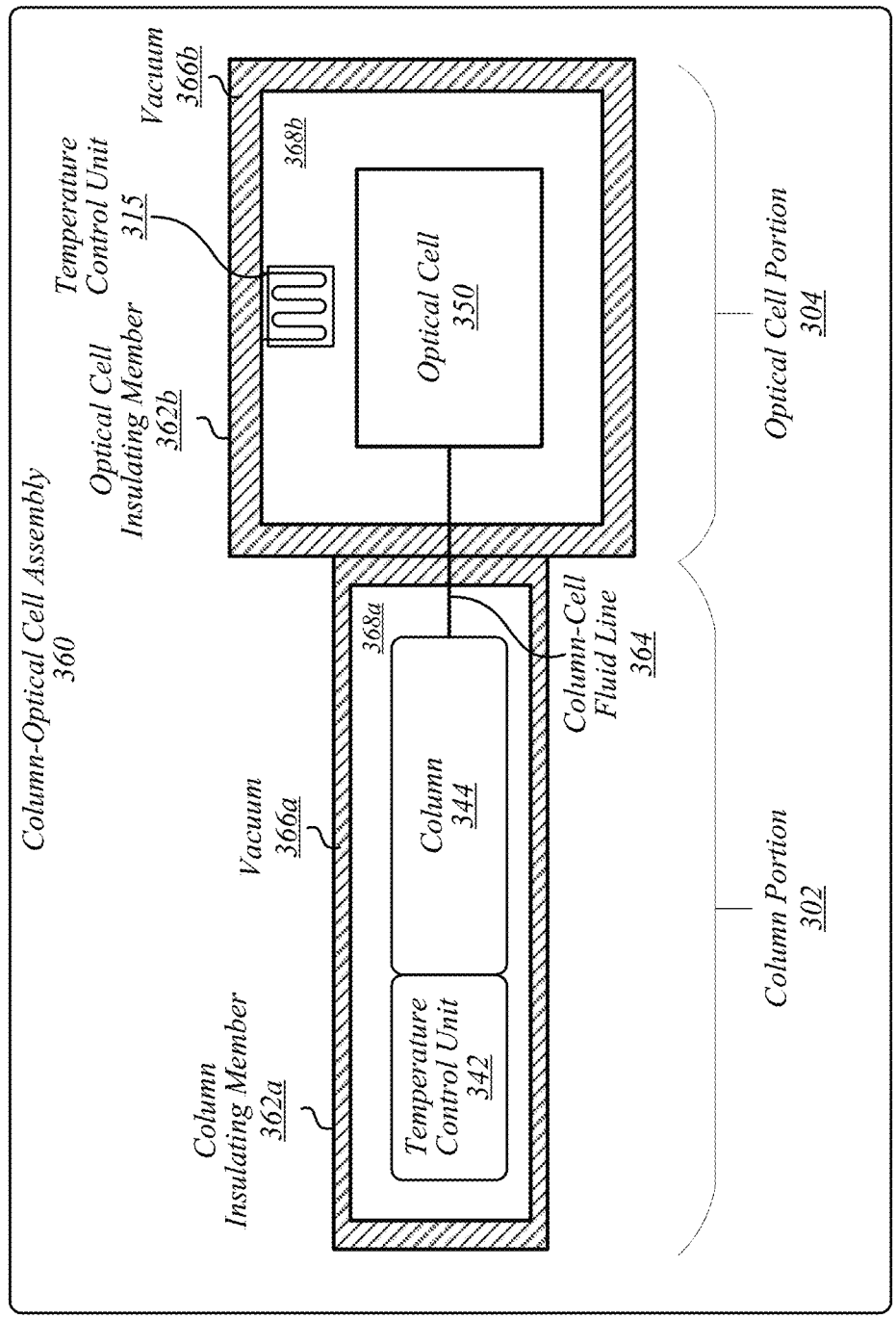
FIG. 3 illustrates a column-optical cell assembly according to some embodiments.

FIG. 3 depicts a column-optical cell assembly according to some embodiments. As shown in FIG. 3, a column-optical cell assembly 360 may include a column portion 302 and an optical cell portion 304. Column portion 302 may include a column insulating member 362a housing a temperature control unit 342 and a column 344. In some embodiments, temperature control unit 342 may operate to heat an inlet (or fluid entering an inlet) of column 344. In other embodiments, temperature control unit 342 (or another temperature control unit (not shown)) may be arranged to heat an outlet (or fluid exiting the outlet) of column 344. In various embodiments, column insulating member 362a may be or may include a vacuum-jacket, for instance, having a vacuum 366a arranged within an inner and outer wall thereof. In some embodiments, an interior cavity 368a of column insulating member 362a may have be under vacuum conditions. In various embodiments, optical cell insulating member 362b may be or may include a vacuum-jacket, for instance, having a vacuum 366b arranged within an inner and outer wall thereof. In some embodiments, an interior cavity 368b of optical cell insulating member 362b may have be under vacuum conditions. In some embodiments, column insulating member 362a and optical cell insulating member 362b may be formed as a single integral insulating member unit. In other embodiments, column insulating member 362a and optical cell insulating member 362b may be separate units coupled to each other via an air-tight interface.

In some embodiments, a temperature control unit 315 may be arranged within optical cell portion 304, for example, within cavity 368b. Temperature control unit 315 may be or may include a cooler and/or a heater. The column-cell fluid line 364, or other lines providing fluid flow into or out of any insulating elements, may include sealed feedthrough devices or conduits. In some embodiments, column-cell fluid line 364 may include a channel, gasket, flange, and/or the like arranged on or within interfacing housings of column 344 (or column insulating member 362a) and optical cell 350 (in an embodiment without optical cell insulating member) or optical cell insulating member 362. In some embodiments, optical cell 350 may be thermally controlled via a temperature control unit 315 to a constant temperature. In some embodiment, the output fluid is allowed to equilibrate to the optical cell temperature prior to entering the optical fluidic volume. For instance, the temperature equilibration may be achieved by flowing the solution into capillary in thermal contact with the optical cell or through fluidic channels incorporated in the optical cell body. In some embodiments, a temperature match tolerance may be less than or equal to about 0.1° C.

In various embodiments, temperature sensors (not shown) may be arranged to monitor the temperature of optical cell 350, column 344, fluid entering column 344, fluid exiting column 344, fluid entering optical cell 350, and/or fluid exiting optical cell 350. Temperature control units 342 and/or 315 may be operated to maintain specified temperatures within various elements of column-optical cell assembly 360, for example, via PID, feedback loop, or other temperature control process, software application, or algorithm. In this manner, various embodiments may operate to provide a temperature-controlled environment in which the mobile phase exiting column 344 is the same or substantially similar to a temperature of optical cell 350 or fluid within optical cell. In other embodiments, the temperature of the fluid entering optical cell 350 is maintained at a constant or substantially constant value (for instance, within a tolerance threshold), that may be different from the temperature of the fluid exiting column 344.

Figure 4:
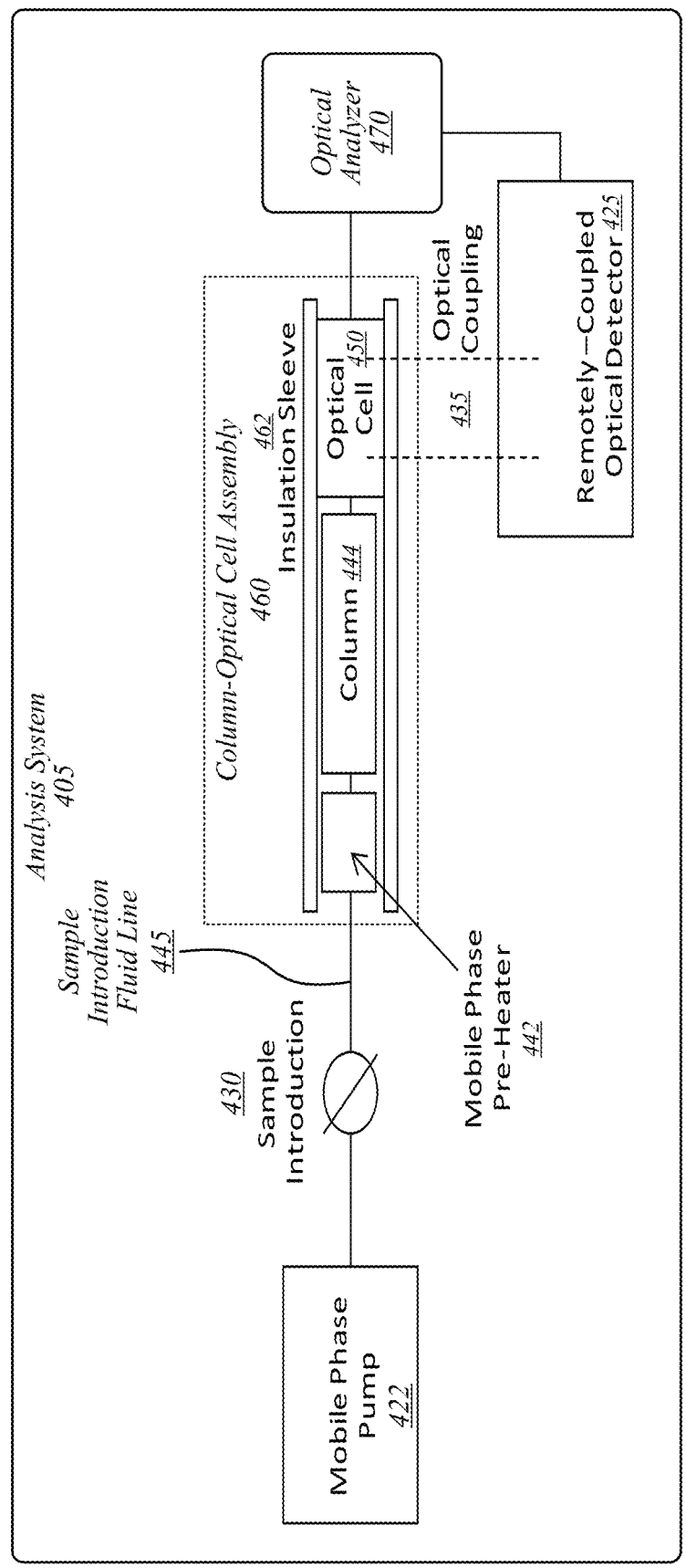
FIG. 4 illustrates an embodiment of a third operating environment.

FIG. 4 illustrates an example of an operating environment 400 that may be representative of some embodiments. As shown in FIG. 4, an analysis system 405 may include a mobile phase pump 422 operative to pump a sample through a sample introduction element 430 to a column-optical cell assembly 460. A sample introduction fluid line 445 may be arranged between sample introduction element 430 and column-optical cell assembly 460 operative to provide a conduit for the sample fluid into column-optical cell assembly 460. In various embodiments, sample introduction fluid line 445 may be minimized or even eliminated or substantially eliminated. Reducing both pre and post-column volume of analysis system 405, may facilitate reduction of gradient and/or isocratic peak widths and may reduce dwell volume.

Column-optical cell assembly 460 may include at least one temperature control unit, such as a mobile-phase pre-heater 442, a column 444, and an optical cell 450 arranged within an insulation sleeve 462. Optical cell 450 may be coupled to a remote optical detector 425 via an optical coupling 435, for example, via an optical fiber coupling. For example, optical cell 450 may include only the components required to receive the fluid from column 444 and radiate the sample fluid with light to provide light information to optical detector 425 via optical coupling 435. In some embodiments, optical detector 425 may include processing elements, such as an optical detector, signal processing unit, and/or the like. In the embodiment depicted in FIG. 4, optical cell may thermally equilibrate rapidly to the mobile phase temperature. In some embodiments, reducing the thermal mass of the optical cell may result in faster equilibration times. In other embodiments, the fluid temperature may be allowed to equilibrate to the flow cell temperature prior to entering the optical fluidic volume.

Figure 5A:
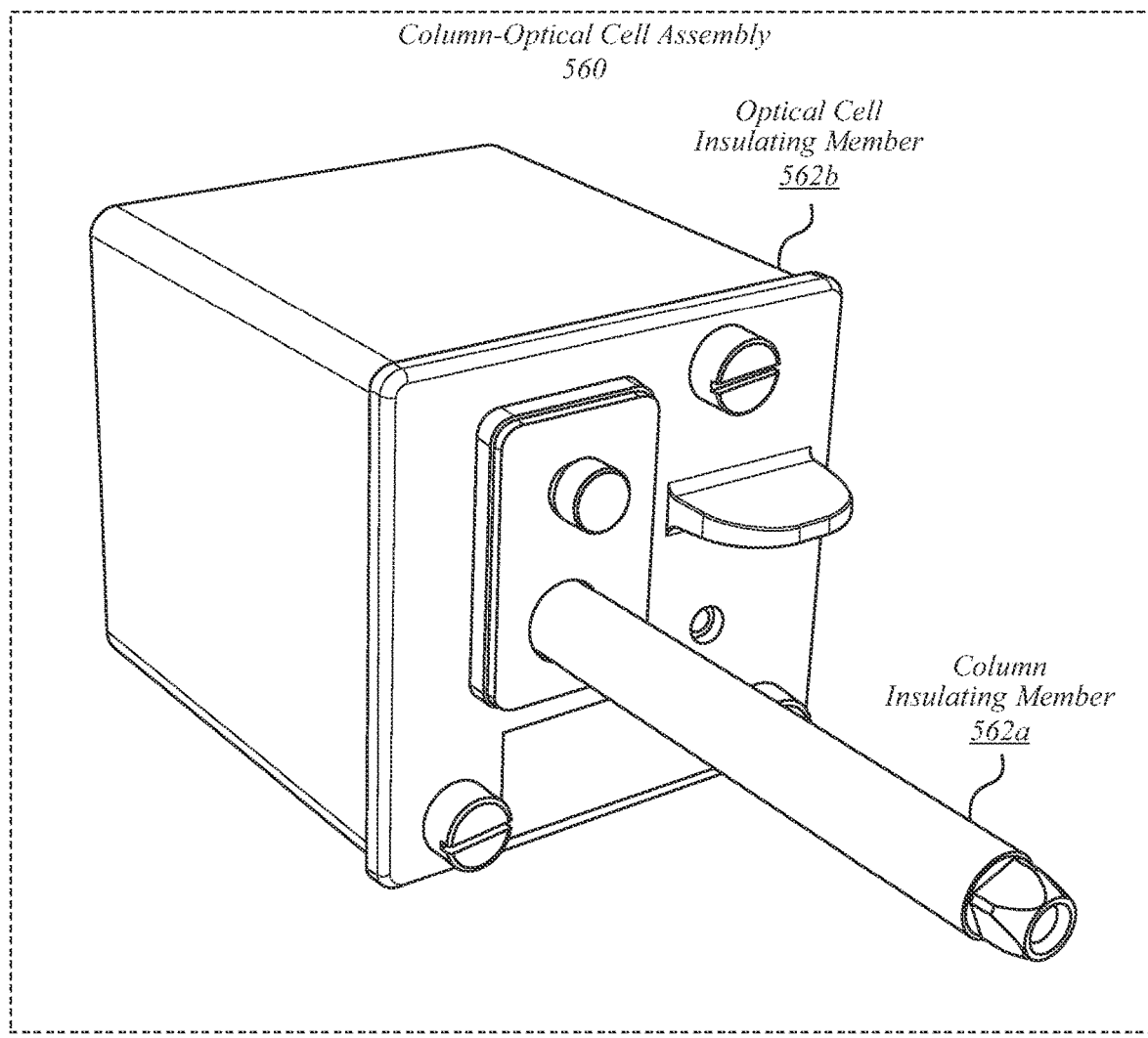
FIG. 5A illustrates a first view of a column-optical cell assembly according to some embodiments.
Figure 5B:
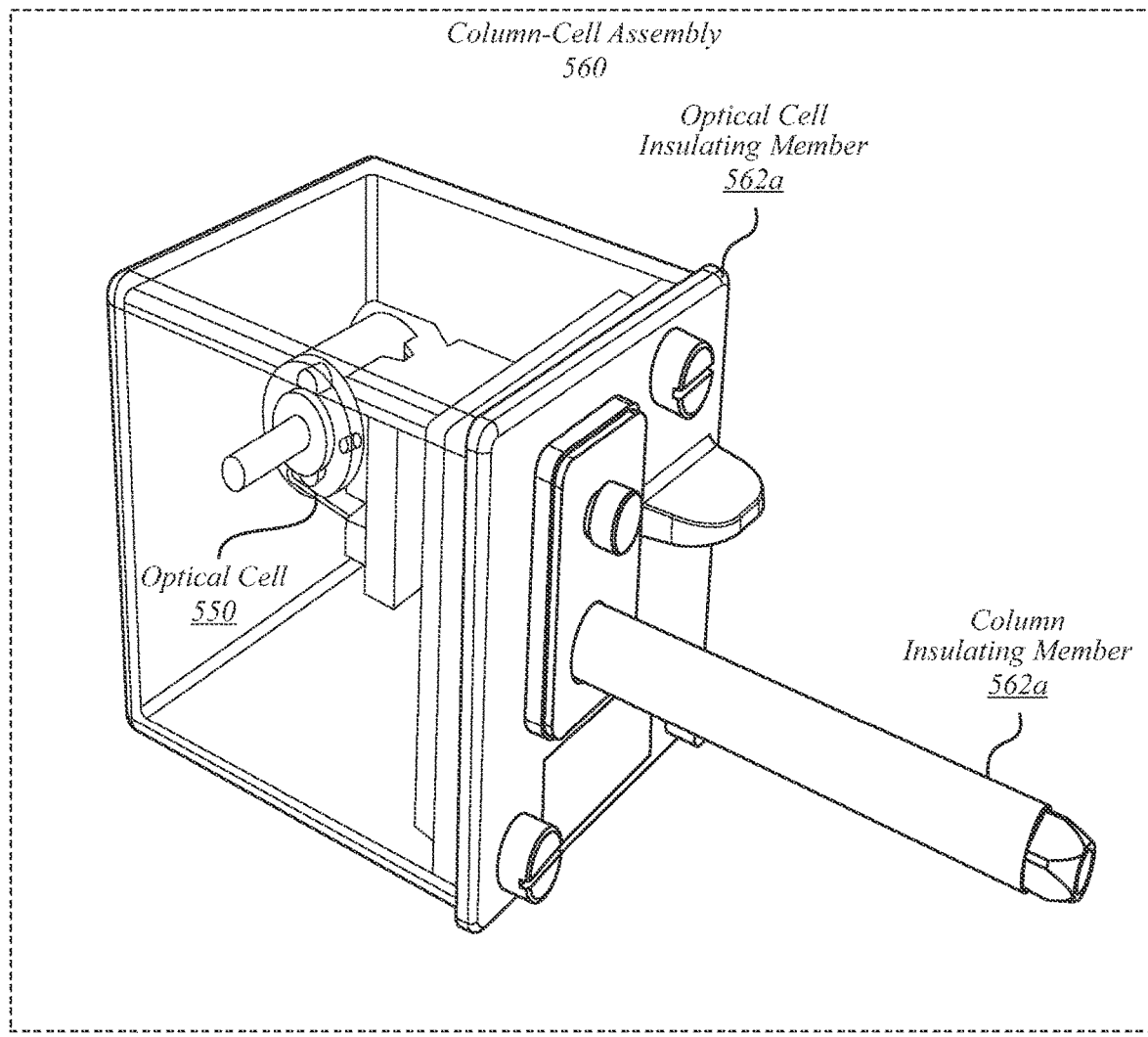
FIG. 5B illustrates a second view of a column-optical cell assembly according to some embodiments.

FIG. 5A illustrates a column-optical cell assembly according to some embodiments. As shown in FIG. 5A, a column-optical cell assembly 560 may include a column insulating member 562a coupled to an optical cell insulating member 562b. An LC column may be arranged within column insulating member 562a. Referring to FIG. 5B, therein is shown a view of column-optical cell assembly 560 depicting an optical cell 550 arranged within column-optical cell assembly 560. In various embodiments, optical cell 550 may be or may include a remotely-located UV detector having a direct connection between a vacuum-jacketed column arranged within a vacuum-jacket structure of column insulating member 562a.

In various embodiments, an outlet end of column may be located within optical cell insulating member 562b such that a connection or interface between a column and optical cell 550 is located entirely or partially within optical cell insulating member 562b. In some embodiments, a temperature control unit, such as a heater, may be arranged within column insulating member 562a and/or optical cell insulating member 562b. In other embodiments, a temperature control unit may not be arranged within column insulating member 562a and/or optical cell insulating member 562b.

Figure 6A:
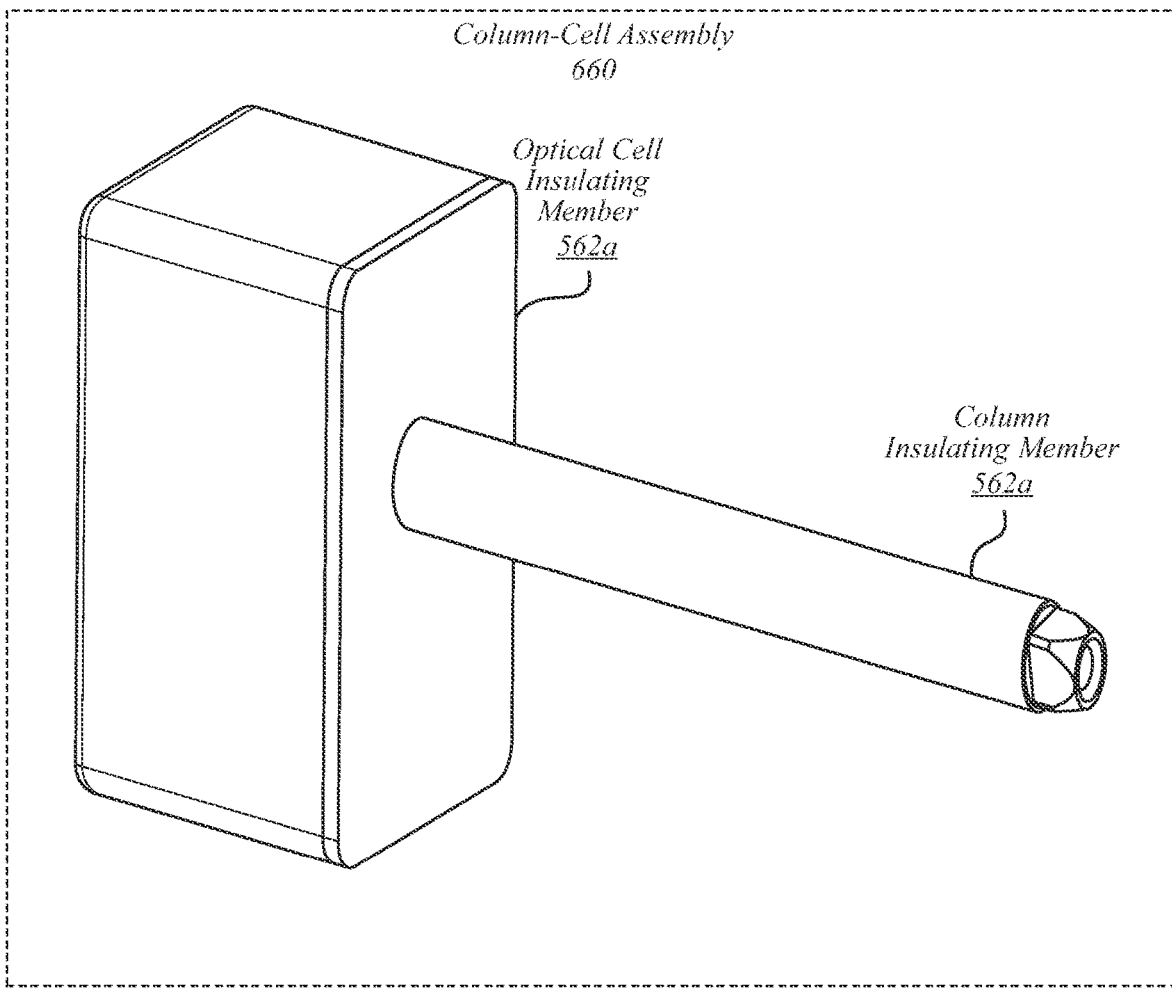
FIG. 6A illustrates a first view of a column-optical cell assembly according to some embodiments.
Figure 6B:
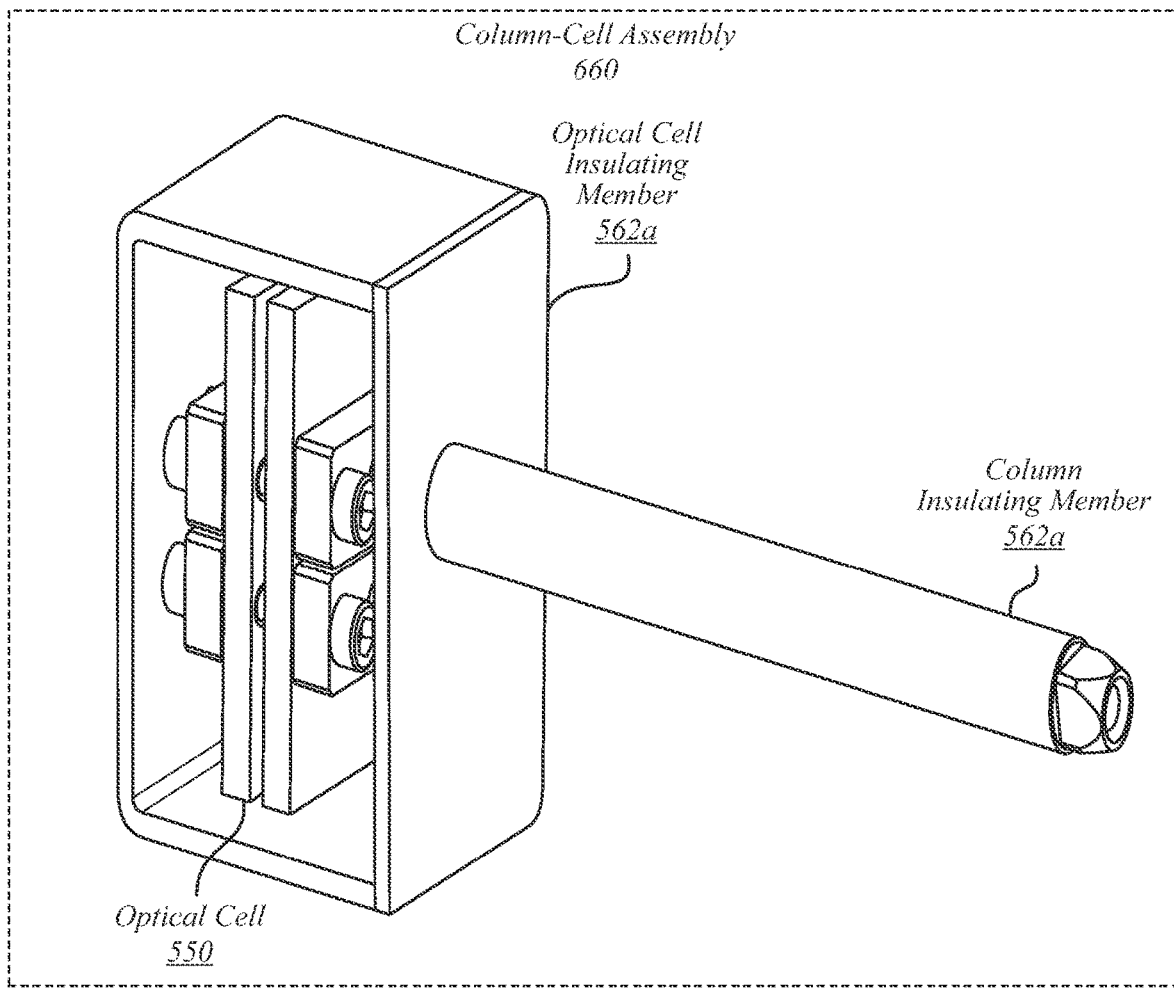
FIG. 6B illustrates a second view of a column-optical cell assembly according to some embodiments.

FIG. 6A illustrates a column-optical cell assembly according to some embodiments. As shown in FIG. 6A, a column-optical cell assembly 660 may include a column insulating member 662a coupled to an optical cell insulating member 662b. An LC column may be arranged within column insulating member 662a. Referring to FIG. 6B, therein is shown a view of column-optical cell assembly 660 depicting an optical cell 650 arranged within column-optical cell assembly 660. In some embodiments, optical cell 650 may be or may include a UV optical cell. Embodiments are not limited in this context.

Other embodiments may include one or more compartments, insulating members, insulating sleeves, and/or the like which provide a thermal environment to minimize, reduce, or even eliminate or substantially eliminate heat transfer for a column-optical cell assembly, fluids thereof, and/or components thereof. Within one of more of the compartments, thermal conditioning, (e.g., heating and/or cooling) may be incorporated. In one or more of the compartments, a detector cell (for instance, UV, TUV, PDA, RI, fluorescence, and/or the like) may be remotely located and positioned. Fluidic and/or optical lines requiring access to the compartment may be formed using a sealed feedthrough device. In one or more of the compartments, a separation device (for instance, a chromatographic column) may be located and positioned such that its outlet may be in close proximity or directly connected to the detector cell inlet, forming an interface. The interface may be configured such that the column makes a direct connection to the detector cell or an interconnection tube of minimal length may be chosen. The interface may be configured such that sample dispersion and any effects from thermal gradients between the detector cell and the separation device are minimized, reduced, or eliminated or substantially eliminated. Embodiments are not limited in this context.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A column-optical cell assembly, comprising:
a column thermal insulation sleeve;
a mobile phase preheater arranged within the column thermal insulation sleeve for preheating mobile phase;
a liquid chromatography column arranged within the column thermal insulation sleeve;
an optical cell thermal insulation sleeve; and
an optical flow cell arranged in the optical cell thermal insulation sleeve and in fluid communication with the liquid chromatography column, the liquid chromatography column arranged within 30 millimeters of the optical flow cell.

2. The column-optical cell assembly of claim 1, wherein the optical flow cell is positioned less than 10 millimeters from the liquid chromatography column.

3. The column-optical cell assembly of claim 1, wherein the optical flow cell is in optical communication with an optical detector.

4. The column-optical cell assembly of claim 1, further comprising a temperature control unit operative to control a temperature of a fluid at an outlet of the liquid chromatography column.

5. The column-optical cell assembly of claim 1, the optical flow cell configured to provide spectroscopic information comprising at least one of absorbance, FTIR, Raman, fluorescence, or information related to the changes in refractive index of the mobile phase/sample complex.

6. The column-optical cell assembly of claim 1, wherein the column thermal insulation sleeve and the optical cell thermal insulation sleeve are a single integral thermal insulation sleeve.

7. The column-optical cell assembly of claim 1, further comprising an optical cell temperature control unit arranged within the optical cell thermal insulation sleeve.

8. The column-optical cell assembly of claim 7, wherein the optical flow cell comprises an optical and the optical cell temperature control unit controls a temperature of the optical cell to correspond to a temperature of a fluid entering the optical cell from the column.

9. The column-optical cell assembly of claim 7, wherein the temperature control unit is configured to control a temperature of a fluid entering the optical flow cell from the liquid chromatography column to correspond to a temperature of the optical flow cell.

10. The column-optical cell assembly of claim 1, further comprising a remote optical device coupled to the optical flow cell via an optical coupling.

11. The column-optical cell assembly of claim 1, wherein the column thermal insulation sleeve comprises a vacuum jacketed device.

12. The column-optical cell assembly of claim 11, wherein an optical cell of the optical flow cell is arranged within the vacuum jacketed device.

13. The column-optical cell assembly of claim 1, wherein the chromatography column is positioned within 5 mm of the optical flow cell.

14. The column-optical cell assembly of claim 1, wherein the liquid chromatography column is directly connected to an optical cell of the optical flow cell.

* * * * *